United States Patent [19]
Collin et al.

[11] Patent Number: 5,797,981
[45] Date of Patent: Aug. 25, 1998

[54] PROCESS FOR DE-ACIDIFYING A GAS FOR PRODUCTION OF CONCENTRATED ACID GASES

[75] Inventors: Jean-Claude Collin, Marsinval-Verneuil; Joseph Larue, Chambourcy; Alexandre Rojey, Rueil Malmaison, all of France

[73] Assignee: Intitut Francais du Petrole, Rueil-Malmaison, France

[21] Appl. No.: 966,021

[22] Filed: Nov. 7, 1997

Related U.S. Application Data

[63] Continuation of Ser. No. 487,400, Jun. 7, 1995, abandoned.

[30] Foreign Application Priority Data

Jun. 8, 1994 [FR] France ................ 94/08.501

[51] Int. Cl.$^6$ ................................................ B01D 47/00
[52] U.S. Cl. ................ 95/174; 95/177; 95/193; 95/229; 95/235; 95/236
[58] Field of Search ................ 95/172, 173, 174, 95/177, 179, 181, 183, 184, 193, 229, 235, 236

[56] References Cited

U.S. PATENT DOCUMENTS

| | | | |
|---|---|---|---|
| 3,324,627 | 6/1967 | Kohrt | 95/193 |
| 3,435,590 | 4/1969 | Smith | 95/174 |
| 3,767,766 | 10/1973 | Tjoa et al. | 95/184 |
| 3,773,896 | 11/1973 | Preusser et al. | 95/183 |
| 4,289,738 | 9/1981 | Pearce et al. | |
| 4,529,424 | 7/1985 | Gazzi et al. | 95/177 |
| 4,714,480 | 12/1987 | Wansink | 95/174 |
| 4,853,012 | 8/1989 | Batteux et al. | 95/174 |
| 4,889,700 | 12/1989 | Elgue et al. | 95/174 |
| 4,934,146 | 6/1990 | Wilhelm et al. | 95/172 |
| 4,979,966 | 12/1990 | Rojey et al. | 95/174 |
| 5,137,550 | 8/1992 | Hegarty et al. | 95/174 |

FOREIGN PATENT DOCUMENTS

| | | | |
|---|---|---|---|
| 1149583 | 7/1983 | Canada | 95/183 |
| 0375077 | 6/1990 | European Pat. Off. | |
| 0 528 709 | 2/1993 | European Pat. Off. | |
| 2 507 499 | 12/1982 | France | |
| 2 636 857 | 3/1990 | France | |
| 34 11 532 A | 10/1985 | Germany | 95/183 |

*Primary Examiner*—C. Scott Bushey
*Attorney, Agent, or Firm*—Antonelli, Terry, Stout & Kraus, LLP

[57] ABSTRACT

A method of treating a gas, for example, natural gas containing at least one hydrocarbon and at least one acid gas to remove the acid gas from the natural gas and to produce at least one concentrated acid gas, wherein the gas is subjected to at least two stages of absorption using polar solvents having different properties.

29 Claims, 5 Drawing Sheets

PROCESS FOR DE-ACIDIFYING A GAS FOR PRODUCTION OF CONCENTRATED ACID GASES

This application is a Continuation application of application Ser. No. 08/487,400, filed Jun. 7, 1995, now abandoned.

FIELD OF INVENTION

The objective of the present invention is to treat a gas, in particular a natural gas, with the aim of removing at least partially any acid gases it contains and to produce at least one concentrated acid gas.

The method of the invention is particularly suitable for de-acidifying a natural gas and its condensates to produce concentrated acid gases.

DESCRIPTION OF THE PRIOR ART

French patents FR-2.605.241 and FR-2.636.857 describe processing methods using a refrigerated physical solvent enabling the different stages of processing a gas to be carried out, including de-acidification and the removal of water.

These methods have advantages over techniques of the prior art, in particular the option of using the same polar solvent for dehydration and de-acidification of the gas as well as the possibility of regenerating the solvent by bringing the solvent in direct contact with the gas to be processed (patent FR-2.605.241), leading to considerable savings in energy consumption and capital outlay and reducing the amount of plant required.

However, if the gases contain hydrocarbons, a fraction of hydrocarbon is absorbed in the solvent during the course of the de-acidification process, which on the one hand makes the production or processing of concentrated acid gases difficult, particularly in the case of hydrogen sulphide because of the Claus reaction, and leads to a loss in actual gas output on the other.

SUMMARY OF THE INVENTION

The present invention overcomes the disadvantages of the prior art by making use of a series of absorption stages followed by regeneration stages during which the gas is placed in contact with a physical polar solvent.

One advantage of this is that the solvent phase resulting from the second absorption stage is regenerated to a greater extent than the fraction of solvent phase obtained from the first absorption stage.

In addition, with environmental regulations becoming ever more stringent, the present invention can be usefully applied in the removal of the acid gases and hydrogen sulphide $H_2S$ contained in gaseous effluents.

Throughout this description, the terms "contact zone" or "contactor" are used indifferently to denote the part of the device used to bring a fluid in contact with a solvent.

Similarly, the expression rich solvent phase relates to a solvent that is enriched with acid gases and poor solvent phase to a solvent phase from which acid gases have been removed during the process.

The present invention relates to a method for processing a gas containing at least one hydrocarbon and at least one acid gas with the aim of removing at least partially the gas of the acid gas and producing at least one concentrated acid gas.

It is characterised in that it incorporates at least the following steps:

(a) the gas is cooled and, at a temperature lower than or equal to the ambient temperature, is brought into contact with a first mixture of solvent phase containing at least one polar solvent and water in order to obtain a first fraction of solvent phase that is rich in acid gases and contains hydrocarbons in solution and a fraction of gas that is low in acid gases, (b) the first fraction of the solvent phase, rich in acid gases, obtained from step (a) is regenerated by reducing the pressure and/or raising the temperature to produce a gaseous fraction that is rich in acid gases and contains the hydrocarbon and a solvent phase that is low in acid gases and which is then recycled back to step (a), (c) the gaseous fraction rich in acid gases obtained from step (b) is brought into contact with a second mixture of solvent phase containing at least one polar solvent and water in order to produce a gaseous fraction that is enriched with hydrocarbon and a second fraction of solvent phase that is enriched with acid gases, (d) the second fraction of solvent phase enriched with acid gases obtained from step (c) is regenerated by reducing the pressure and/or raising the temperature, to produce a gaseous fraction that has a higher concentration of acid gases than the gaseous fraction separated out during the course of step (b) and a fraction of solvent phase that is recycled back to step (c).

The second mixture of solvent phase may contain the same polar solvent as that contain ed in the first mixture used during step (a).

The water content in the second fraction of solvent phase may be at least equal to the water content of the first fraction of solvent phase.

Step (b) is carried out at an intermediate pressure level, for example, between the pressure level at which step (a) is carried out and that at which step (d) is carried out.

The second fraction of solvent phase can be regenerated during step (d) by simple expansion at a pressure level below the pressure level at which step (c) is carried out.

The first and/or second fraction of solvent phase are regenerated by a process of distillation at a pressure level lower than the pressure level at which step (c) is carried out.

One of the fractions of solvent phase can be regenerated by means of distillation accompanied by simultaneous heat exchange between the fraction of solvent phase, which is heated gradually, and the solvent phase resulting from the regeneration, which is cooled as it is circulated in counter-flow with the solvent phase being regenerated.

The second fraction of solvent phase resulting from step (c) may be subjected to a stage of intermediate regeneration by expansion to produce a gaseous phase that is enriched with hydrocarbons during step (c) before it is moved on to step (d).

The first fraction of solvent phase from step (a) may be subjected to a regeneration stage at an intermediate pressure level between the pressure at which step (a) is carried out and the pressure level at which step (b) is carried out to produce a gaseous fraction rich in hydrocarbons.

The first and second gaseous fractions resulting respectively from step (c) and step (b) may be compressed and recycled to step (a).

The gaseous fraction from step (b) may be compressed before being sent on to step (c).

The treated gas may contain at least one acid gas selected from carbon dioxide or hydrogen sulphide.

The treated gas contains at least carbon dioxide and hydrogen sulphide and the proportion in the second fraction of solvent phase is maintained at a sufficiently high level to obtain a gaseous fraction at the end of step (c) from which the hydrogen sulphide has been substantially removed and at a sufficiently low level to maintain a relatively high concentration of carbon dioxide in this gaseous fraction, the gaseous fraction obtained at the end of step (d) having a high concentration of hydrogen sulphide.

The polar solvent used during steps (a) and (c) may be selected from methanol, an alcohol or an ether, a polyethylene glycol ether or carbonate of propylene.

The polar solvent used during steps (a) and (c) may contain at least two polar solvents.

The polar solvent used during steps (a) and (c) may contain one polar solvent and an amine.

The water content of the first fraction of solvent phase may by preference be at least 10% of the fraction by mass.

The water content of the second fraction of solvent phase may be greater than the water content of the first fraction of solvent phase and preferably greater than at least 30%.

The natural gas may be cooled in the presence of polar solvent before being sent to step (a), producing a gaseous phase that is sent to step (a), a liquid phase that is rich in hydrocarbons and an aqueous liquid phase that is rich in solvent.

The water may be separated from the polar solvent by counter-flow contact with at least one fraction of treated gas.

The gas may contain at least one fraction of liquid hydrocarbon (LPG), this fraction being sent to a stage of de-methanisation in which the pressure is lowered and/or the temperature raised and then to a stage of de-ethanisation, during the course of which the residual methane, the ethane and the acid gases present in this liquid hydrocarbon phase are at least partially separated out.

Step (a) may be carried out at a pressure level ranging between 1 and 20 MPa.

Step (a) may be carried out at a temperature ranging between +5° and -50° C.

Step (c) may be carried out at a pressure level ranging between 0.4 and 2 MPa.

At least one of the fractions of solvent phase mixture used during steps (a) and (c) may be regenerated by distillation accompanied by heat exchange in a vertical plate exchanger with alternating passages in which on the one hand counter-flow contact is made between the liquid phase and the vapour phase generated during the distillation process and on the other in which the solvent phase obtained from this regeneration flows, this latter being cooled as it is circulated in counter-flow with the solvent phase during regeneration.

The expansion energy of the one or both fractions of solvent phase mixture is converted to mechanical energy by means of a turbine.

BRIEF DESCRIPTION OF THE DRAWINGS

The invention and its characteristics will be more readily understood from the following description, given solely as a means of illustration and in no way limitative, and from the attached drawings, which show respectively the following.

DETAILED DESCRIPTION OF THE INVENTION

Figure 1:
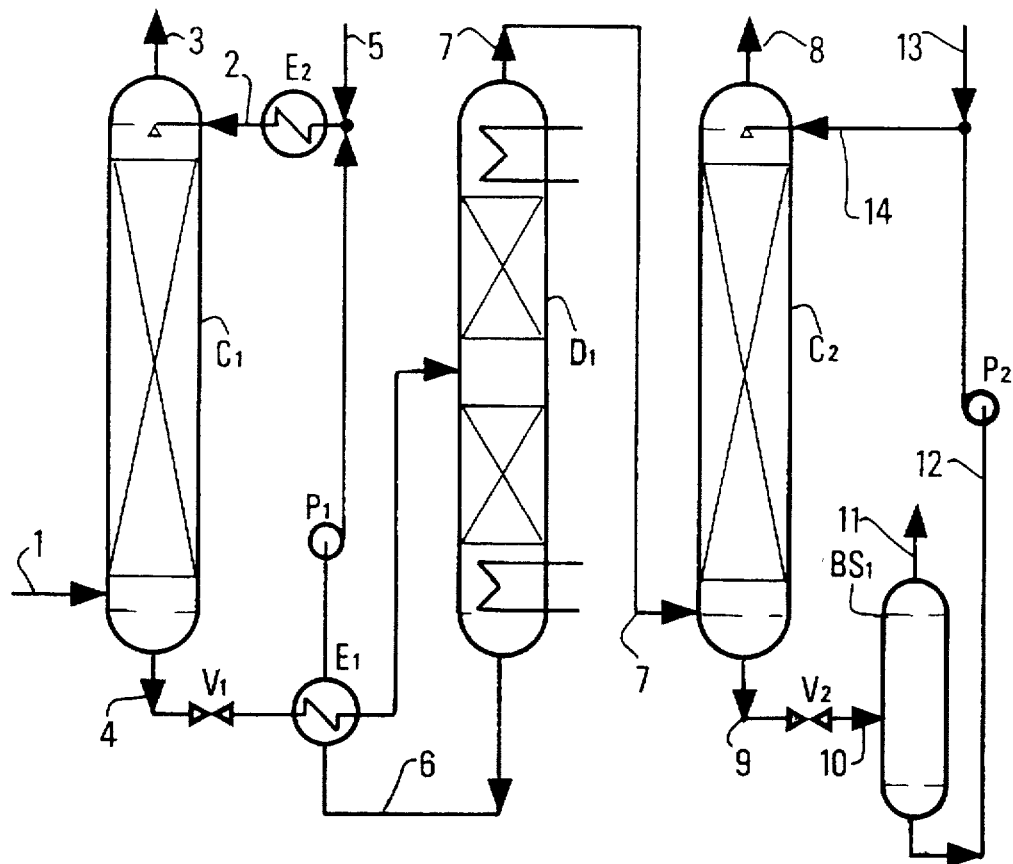
FIG. 1 shows schematically the principle of the method of the invention.

The principle of the method of the invention is illustrated with reference to the diagram of FIG. 1, showing an example of one configuration of the device as applied, for example, to the treatment of a natural gas in order to de-acidify it and obtain concentrated acid gases.

The principle involves at least four steps, a,b, c, d, described below.

The natural gas to be treated, which contains acid gases and at least one hydrocarbon, is firstly cooled and then conveyed via pipe 1 into the contact zone $C_1$ where it is brought into counter-flow contact, at step (a), for example, with a first mixture of solvent phase and water arriving via pipe 2, the solvent containing at least one polar solvent, for example. The acid gases are selectively absorbed in this contact zone $C_1$ and at the same time a fraction of the hydrocarbons contained in the natural gas is also absorbed.

A gaseous phase that is low in acid gases is removed from the upper part of the contactor $C_1$ via pipe 3.

A first fraction of solvent phase charged with acid gases and hydrocarbons in solution is drawn off from the lower part of the contact zone or contactor $C_1$ via pipe 4.

The first fraction of solvent phase from step (a) is sent to the distillation zone $D_1$. To encourage vaporisation of the acid gases, this first fraction of solvent phase is put through a process of expansion during step (b), for example by means of the expansion valve $V_1$, and/or of heating; in the latter case, it is heated in the exchanger $E_1$, for example.

The solvent phase regenerated in this manner is drawn off from the bottom of the distillation zone $D_1$ via pipe 6.

This first fraction of regenerated solvent phase is returned to the contact zone $C_1$. To this end, it is picked up by the recycling pump $P_1$ and sent into the exchanger $E_1$ where it is cooled, for example, by heat exchange with the first fraction of solvent phase from the expansion valve $V_1$. If necessary, this first, regenerated solvent phase is then mixed with additional solvent arriving from pipe 5 in order to compensate any losses of solvent in the de-acidified gas and also in the acid gases produced. The resulting mixture is cooled in the exchanger $E_2$ by an external auxiliary cooling fluid, for example, and recycled back to the contact zone $C_1$ via pipe 2.

A vapour phase that is rich in acid gases and also contains hydrocarbons in solution is removed from the head of the distillation zone $D_1$ via pipe 7 to the contactor $C_2$ where, during step (c), it is brought into contact, for example, by counter-flow with a second mixture of solvent and water arriving via pipe 14; the solvent may contain at least one polar solvent.

The second mixture of solvent and water may contain the same polar solvent as that used in step (a) and water and its water content may be at least equal to and preferably greater than the water content of the solvent phase fraction of the first mixture used during step (a).

At the output of the contactor $C_2$, a gaseous phase that has been enriched mainly with hydrocarbons, is discharged via pipe 8 located at the head.

At the bottom of the contactor $C_2$, a second fraction of solvent phase containing the absorbed acid gases is discharged via pipe 9, this second fraction then being sent through pipe 10 to a separator flask $BS_1$ passing via the expansion valve $V_2$ located between pipes 9 and 10, where it is expanded during step (d). The acid gases released at the end of this expansion stage are then separated in the separator flask $BS_1$.

A vapour phase concentrated in acid gases is evacuated from the head of the separator flask $BS_1$ via pipe 11 and a second fraction of regenerated solvent phase is evacuated from the base of the flask via pipe 12.

The second regenerated fraction is returned to the contactor $C_2$. To this end, it is conveyed by the recycling pump $P_2$ and then mixed, if necessary, with additional solvent arriving from pipe 13 to compensate for any solvent losses, the mixture resulting from this topping up process being returned to the contactor $C_2$ via pipe 14, at the head of the contactor, for example.

The example of this embodiment illustrates the four main steps of the process, which consists in particular of a first absorption step (a), followed by a first regeneration step (b), and a second absorption step (c) followed by a second regeneration step (d).

The first mixture of solvent and water is preferably brought into contact with the natural gas to be treated during step (a) at a temperature lower than the ambient temperature.

Step (b), during which the first fraction of solvent phase from step (a) is regenerated, is preferably operated at an intermediate pressure level between the pressure at which the absorption step (a) is conducted and that of step (d) when the second fraction of solvent phase from step (c) is regenerated.

For certain applications, it is not necessary to remove all the acid gases from the hydrocarbon enriched gaseous phase obtained from absorption step (c). In this case, step (d) to regenerate the second fraction of solvent phase may consist of a simple expansion through a valve at a pressure level lower than the absorption pressure level of step (c).

In certain instances, for example where the aim of gas treatment is to produce a high output in terms of gas production, it is important to produce hydrocarbons at the end of step (c) from which the amount of acid gases removed is sufficient to allow them to be recycled downstream in a processing chain or to be used as combustion gas. In these cases, the second fraction of solvent phase from step (c) is regenerated to a greater extent so as to improve efficiency in the second absorption step. Examples of how steps (c) and (d) are carried out are described with reference to FIGS. 2 to 4.

Figure 2:
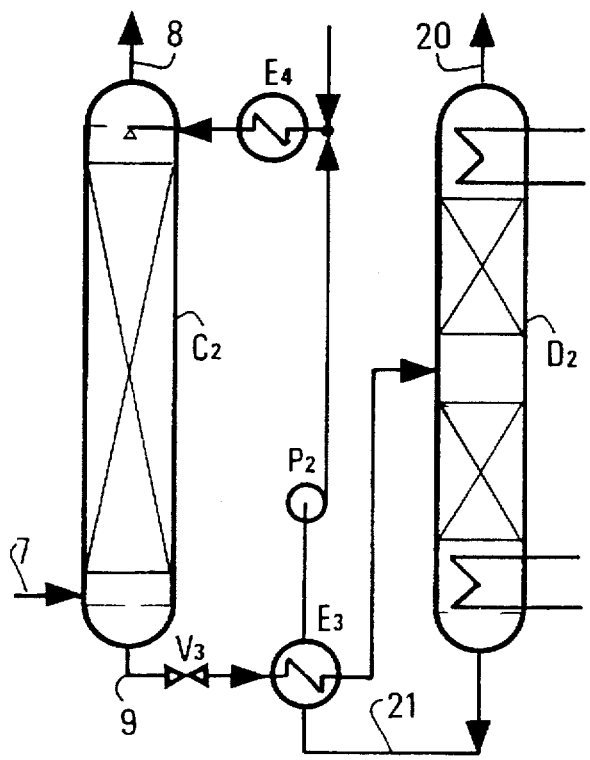
FIGS. 2 to 4 describe embodiments in which improvements can be made to the various regeneration stages.

The apparatus described in relation to FIG. 2 incorporates, in addition to the equipment shown in FIG. 1, an additional distillation zone $D_2$ located after the absorption process of step (c) described above, steps (c) and (d),for example, being carried out as follows.

The second fraction of solvent obtained from step (c) drawn off from the base of the contact zone $C_2$ via pipe 9 is sent into the distillation tower $D_2$ passing through an expansion valve $V_3$ and the exchanger $E_3$, where it is firstly expanded and then heated. The acid gases are removed from the upper part of the tower $D_2$ via pipe 20, whilst the second fraction of regenerated solvent phase is discharged from the bottom of the tower $D_2$ via pipe 21. This latter is then returned to the contactor $C_2$ via the exchanger $E_3$ where it sheds its calories, the recycling pump $P_2$ and the exchanger $E_4$ where it is cooled.

The second fraction of solvent phase from step (c) is regenerated during step (d) by means of distillation in this example, preferably at a pressure level lower than the pressure level at which step (c) is carried out.

Figure 3:
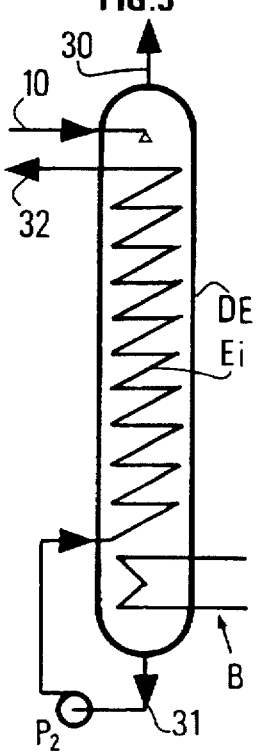

FIG. 3 illustrates a variant of the embodiment of the device incorporating a distillation tower DE with an integrated exchanger Ei located, for example, in the place of the separator flask $BS_1$ (FIG. 1) or thereafter, this tower making it possible to regenerate any one of the solvent phase fractions. In particular, this embodiment allows a simultaneous heat exchange between the regenerated solvent phase that is low in acid gases and the rich solvent phase introduced into the distillation tower.

The second fraction of rich solvent phase from step (c) is expanded by the expansion valve $V_2$ (FIG. 1) and brought at low temperature to the head of the tower DE via pipe 10. It is circulated in the tower DE in counter-flow with the vapour generated by the boiler B of the tower DE, thereby losing some of its content of acid gases in solution whilst heating up as a result of internal exchange with the regenerated solvent phase brought into the tower DE by pipe 31, and is picked up by the pump $P_2$ to be sent on to the internal exchanger E. The regenerated solvent phase thus exchanges heat in counter-flow with the second fraction of solvent phase rich in acid gases. A purified and cooled solvent phase is thus obtained, which is discharged from the head of the tower DE via pipe 32 and returned to the contactor $C_2$ for step (c).

With certain applications, it is possible to incorporate a condenser, not shown in the drawing, in the upper part of the tower DE and/or to place a cooling exchanger at the output of the integrated exchanger Ei.

This embodiment enables a saving of 20 to 50% of overall expenditure on energy.

The second fraction of solvent phase may be regenerated during step (d) by distillation accompanied by a simultaneous heat exchange between the solvent phase fraction, which is heated gradually, and the solvent phase obtained from the regeneration step, which is cooled as it is circulated in counter-flow with the solvent phase being regenerated.

The internal heat exchange between the solvent phase rich in acid gases and the solvent phase low in acid gases as described above may be accomplished by means of various devices.

The integrated exchanger Ei may be of the shell and tube type. In this case, the regenerated solvent phase drawn from the base of the tower DE may flow inside the tubes, distillation occurring outside the tubes and inside the shell.

The tower DE may be of the plate type, where the tubes are placed above each plate so that they become submersed by the rich solvent phase that will be recuperated as it flows over each plate.

The tower DE may be of the continuous contact type, whereby the rich solvent phase streams around the tubes.

The regenerated solvent phase drawn off from the base of the tower DE may also flow over the outside of the tubes and the inside of the shell. In this case, distillation takes place inside the tubes which are preferably vertical and fitted with an internal matrix.

A vertical plate exchanger may also be used. The spaces between the different plates are occupied alternately by the regenerated solvent phase taken from the base of the tower DE and by the solvent phase as well as the vapour phase generated in counter-flow in the tower during the distillation process. This would be an exchanger of, for example, the brazed aluminum type or the stainless steel type, in which the plates are welded either edge to edge or by metal diffusion over the whole of the contact surface between the plates.

Figure 4:
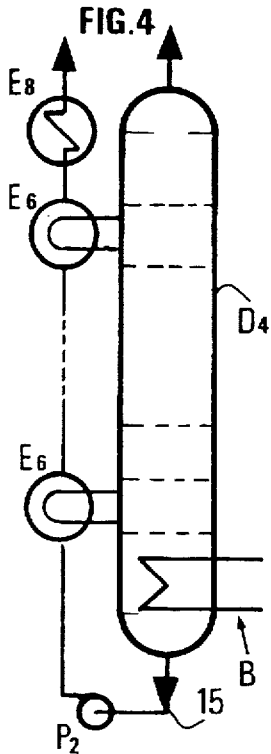

In the diagram shown in FIG. 4, an additional cooling exchanger $E_8$ using external fluid is placed, for example, at the end of the series of exchangers. In particular, this makes it possible to compensate for the heat losses and thus obtain the desired temperature for the poor solvent phase. The simultaneous heat exchange between the poor solvent phase and the rich solvent phase takes place in the following manner, for example. The poor solvent phase, which is at a temperature T, leaves the base of the tower $D_4$ at the level of the boiler B via pipe 15, is pumped by pump $P_2$ and sent to a first heat exchanger $E_6$ where it is cooled by an exchange of heat with the liquid phase from one level of the distillation tower $D_4$ which is flowing, either by being pumped or under the effect of gravity, in this exchanger $E_6$. The poor solvent phase pre-cooled in this manner is introduced into a second exchanger $E_6$ located directly after the first exchanger $E_6$ and then through a succession of exchangers of the same type as $E_6$ until it reaches the head of the tower.

Figure 5:
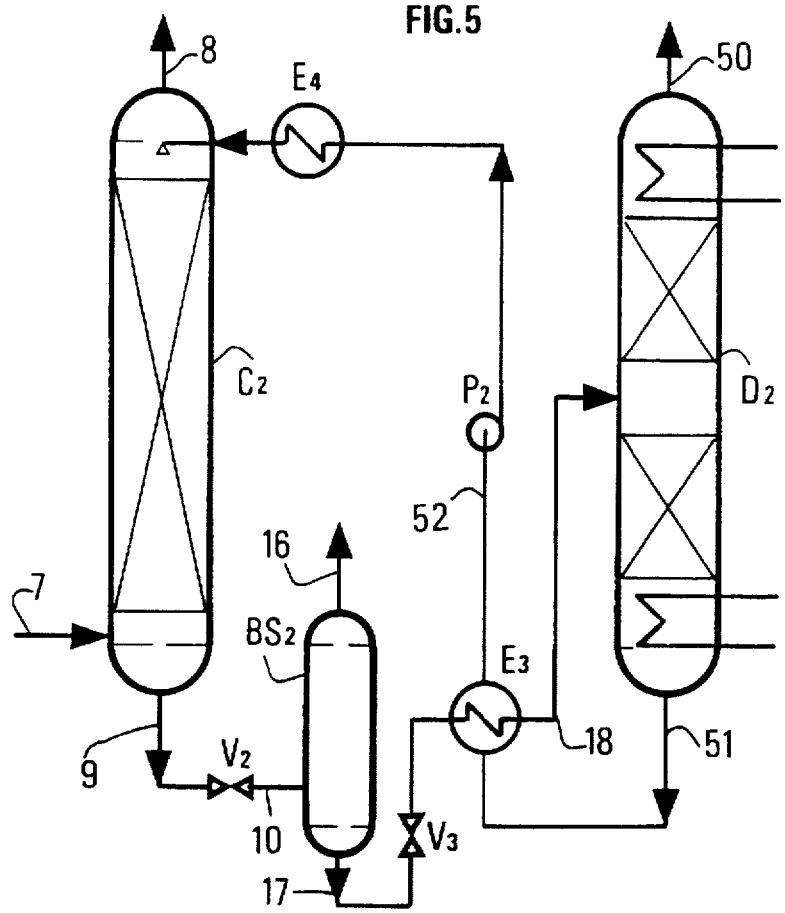
FIG. 5 shows schematically a method enabling very highly concentrated acid gases to be obtained.

The embodiment described in FIG. 5 is particularly well suited to the production of very highly concentrated acid gases. This example describes a specific configuration of means used to carry out steps (c) and (d) so as to reduce the hydrocarbon content of the acid gases produced at the end of step (d) and obtain a higher concentration of acid gases.

The second fraction of solvent phase enriched in acid gases at the end of the second absorption step (c) and coming from the contactor $C_2$ is expanded through the valve $V_2$ to an intermediate pressure level, for example, between the absorption pressure of step (c) and the pressure level at which step (d) is carried out and enters the separator flask $BS_2$ via pipe 10.

The gaseous phase thus produced is evacuated from the head of the separator flask $BS_2$ via pipe 16 entraining the majority of the co-absorbed hydrocarbons.

The solvent phase is drawn off from the base of the flask $BS_2$ via pipe 17, then expanded through valve $V_3$ and heated in the exchanger $E_3$. The expanded and heated solvent phase enters the distillation tower $D_2$ through pipe 18. A vapour phase that is highly enriched with acid gas is drawn via pipe 50 through to the head of the distillation tower $D_2$. This phase may contain, for example, less than 1% of hydrocarbons. The regenerated solvent phase leaves the base of the tower $D_2$ via pipe 51 and is sent to the exchanger $E_3$ where it is pre-cooled, picked up by the recycling pump $P_2$ and returned via pipe 52 to the exchanger $E_4$ where it is cooled using, for example, an external coolant (not shown in the drawing) and recycled to the contactor $C_2$ in readiness for step (c).

In other cases, it is necessary to produce at the end of the de-acidification step (a) a gas that is very low in acid gases, having an acid gas content of less than 3 ppm of $H_2S$ and/or less than 1% of $CO_2$, for example. In this case, the first fraction of solvent phase from step (a) is regenerated to a higher degree, for example. It may be of advantage to regenerate this phase by carrying out step (b) at least partially at a pressure level lower than the pressure level at which step (c) is carried out.

A first method of operating in this way consists in compressing the acid gases from step (b) before sending them to step (c).

A second method is, for example, to carry out a first regeneration of the first solvent phase fraction at a pressure level that will allow the acid gases to be sent directly to step (c). At the output of this first regeneration, the first regenerated solvent phase is virtually free of hydrocarbons. Its purity in terms of acid gases may not, however, be sufficiently high to permit direct recycling to step (a). If this is the case, it may then be sent through a second regeneration step operated at a pressure level close to that at which step (d) is carried out, the acid gases from this second regeneration progress being mixed with the acid gases from step (d).

Figure 6:
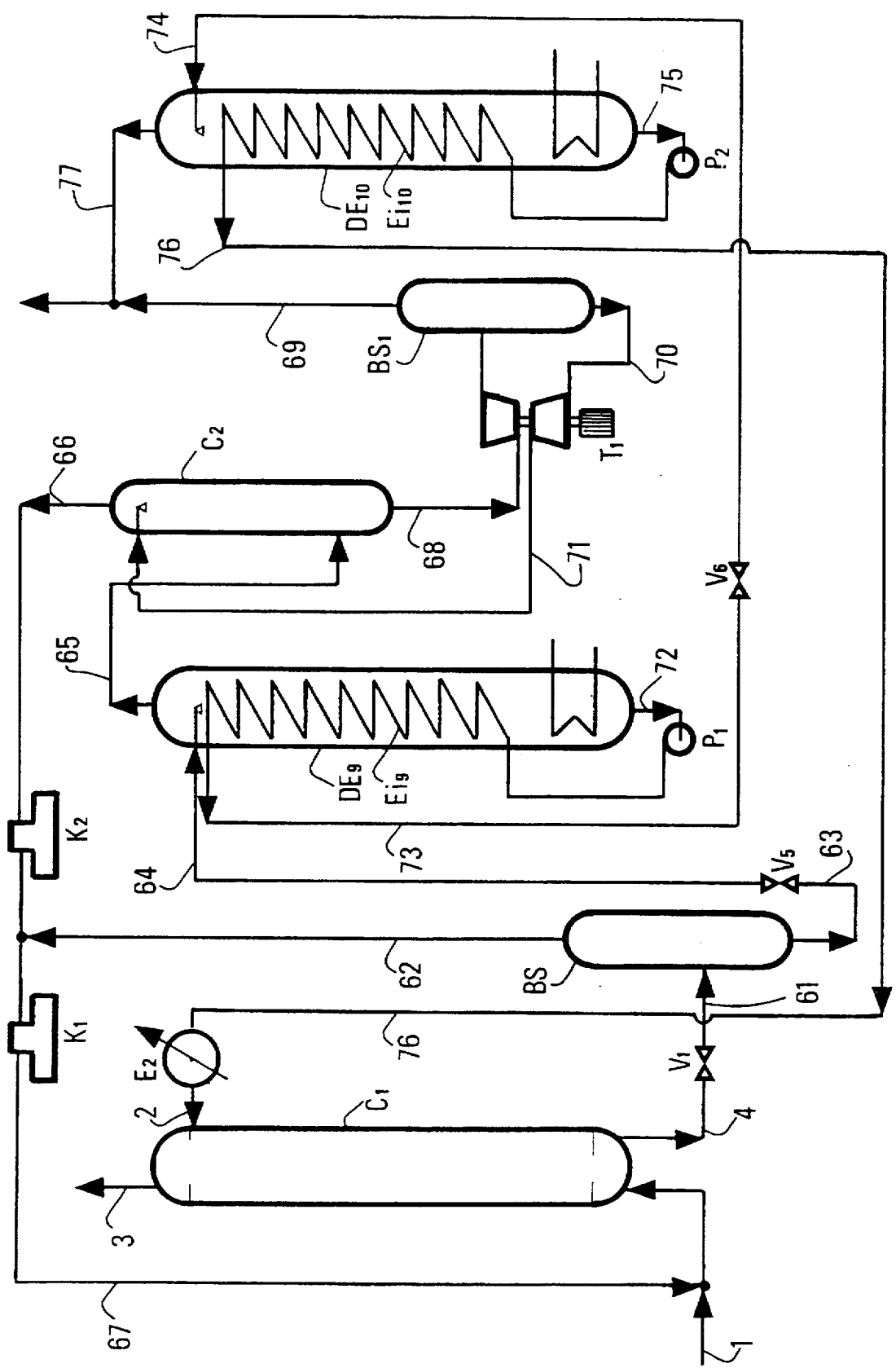
FIG. 6 shows an example of an embodiment in which an increased amount of acid gas is removed from the gas.

An example of this second operating method is illustrated with reference to the diagram of FIG. 6, which shows a specific but not limitative configuration of a device that enables the above result to be obtained.

The first fraction of solvent phase from step (a) is discharged from the base of the absorption tower $C_1$ via pipe 4, expanded through the expansion valve $V_1$ and sent via pipe 61 into the separator flask BS.

The vapour phase thus generated, which is rich in hydrocarbons, is drawn off from the head of the separator flask BS and sent via pipe 62 to a compressor $K_1$ in which it is compressed so that it can then be returned to the contactor $C_1$ at step (a).

The solvent phase rich in acid gases is evacuated from the base of the flask BS via pipe 63 and expanded through the expansion valve $V_5$. It is then sent via pipe 64 into the regeneration tower $DE_9$ which is provided with an internal heat exchanger $Ei_9$ enabling a simultaneous exchange of heat between the solvent phase rich in acid gases and the solvent phase low in acid gases, in a manner identical to that described in relation to FIGS. 3 and 4.

The vapour phase from the distillation tower $DE_9$ is a phase that has been enriched with at least a part of the acid gases and more than 99% of all the initial hydrocarbons dissolved in the solvent phase. This enriched vapour phase is removed from the head of tower $DE_9$ via pipe 65, essentially at the same pressure level, to the contactor $C_2$ in readiness for the absorption step (c) described above. At the exit of the head of the contactor $C_2$, a vapour phase rich in hydrocarbons is drawn through pipe 66 and compressed by the compressor $K_2$ to a pressure level that is, for example, equal to the pressure at the input of the compressor $K_1$.

The compressed vapour phase is then mixed with the vapour phase arriving from pipe 62, the resulting mixture being compressed by the compressor $K_1$ before being recycled upstream of the contactor $C_1$ (step (a)) via pipe 67.

The second fraction of solvent phase enriched with acid gases at the end of step (s) is drawn through pipe 68 from the base of the contactor $C_2$ to the separator flask $BS_1$ via a turbine $T_1$ in which it is expanded. The gaseous phase is extracted from the head of the separator flask $BS_1$ via pipe 69 whilst the regenerated solvent phase from the bottom of the flask is returned via pipe 70 to the turbine $T_1$ and then via pipe 71 to the contactor $C_2$.

At least part of the regenerated solvent phase in the tower $DE_9$ during step (d) is removed from the base of the tower $DE_9$ via pipe 72 and picked up by the pump $P_1$. Virtually all of the dissolved hydrocarbons have been removed. The content in terms of acid gases, particularly its hydrogen sulphide content, however, is nevertheless too high for it to be returned directly to the contactor $C_1$ at step (a). In order to reduce this acid gas content, the regenerated solvent phase is cooled in the internal heat exchanger $Ei_9$, discharged, for example from the head of the distillation tower $DE_9$ via pipe 73 to the expansion valve $V_6$, through which it is expanded to a pressure level greater than or equal to the pressure level of step (d). The partially regenerated, cooled and expanded solvent phase is then injected into the distillation tower $DE_{10}$ via pipe 74, this tower possibly being provided with an internal exchanger $Ei_{10}$. The solvent phase that is regenerated by being passed through the tower $DE_{10}$ is evacuated from the base of the tower via pipe 75 and picked up by the pump $P_2$ before being re-injected into the internal exchanger $Ei_{10}$, where it is cooled, then removed from the head of the tower via pipe 76 to be returned to the contactor $C_1$ back to step (a).

The vapour phase drawn off from the head of the tower $DE_{10}$ via pipe 77 is mainly made up of acid gases. It is mixed with the acid gases from the separator $BS_1$ via pipe 69, these acid gases resulting from the regeneration of the second solvent phase produced in the tower $BS_1$ during step (d).

In accordance with a preferred embodiment of the invention, the mechanical energy from expansion of the various fractions of solvent phase may be recuperated, for example, by means of an expansion turbine $T_1$. In particular, this recuperation process makes it possible to reduce the supply of mechanical energy needed to drive the pumps $P_1$ and $P_2$ used to recycle the solvent phases back to steps (a) and (c). Thus, in the example illustrated in FIG. 6, the expansion energy used to regenerate the second fraction of enriched solvent phase obtained from the contactor $C_2$ makes it possible to drive, at least to some extent, the pump recycling the regenerated solvent back to step (c).

Recovery of mechanical energy by expansion turbine is not limited to the instance illustrated by the previous example but may be considered for any one of the steps of the method during which an expansion occurs.

By limiting the flow of the solvent phase sent to the contactor $C_2$, the $H_2S$ can be selectively separated from the $CO_2$. In this instance, the gaseous phase discharged from the head of the tower $C_2$ via pipe 66 is rich in $CO_2$ and poor in $H_2S$. It contains, for example, less than 2% of $H_2S$. This example shows how the process makes it enables selective de-acidification of the natural gas by separating mainly the hydrogen sulphide $H_2S$ from the natural gas, so that the carbon dioxide $CO_2$ can be recycled at the same time along with a part of the co-absorbed hydrocarbons.

In order to improve the energy consumption of the process, more particularly during the stages when the solvent phase is being cooled, it is possible to operate regeneration of the first fraction of solvent phase during step (b) by a distillation process accompanied by a simultaneous heat exchange during which the solvent phase fraction rich in acid gases is heated gradually by the exchange of heat with the poor solvent phase which, once regenerated, gradually cools as it is circulated in counter-flow with the rich solvent phase. This distillation process accompanied by heat exchange is carried out, for example, using configurations similar to those illustrated in FIGS. 3 and 4.

Figure 7:
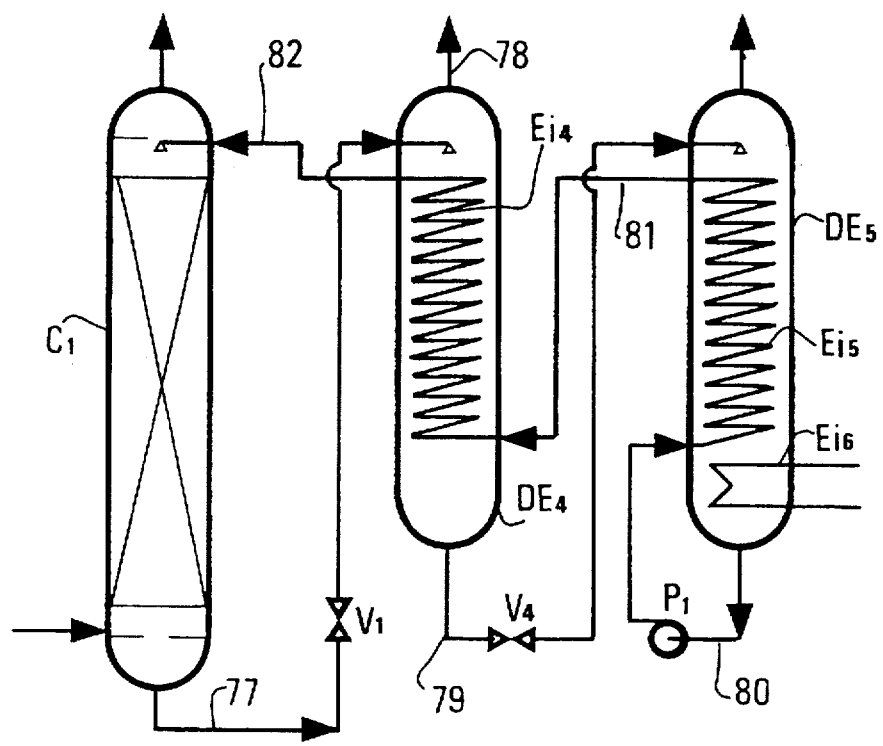
FIG. 7 shows schematically an embodiment which enables the removal of co-absorbed hydrocarbons to be improved.

If it is desirable to eliminate at least in part the hydrocarbons that have been co-absorbed in the first fraction of solvent phase, it is possible to carry out steps (a) and (b) using a device such as that partially illustrated in FIG. 7.

The first regeneration step takes place, for example, at an intermediate pressure level between the pressure level at which the absorption step (a) is carried out and the final pressure level of the distillation step (b) producing a gaseous phase that is particularly rich in hydrocarbons.

The first fraction of solvent phase rich in acid gases emerging from the base of the tower $C_1$ via pipe 77 is expanded through the valve $V_1$ and introduced at the head of the tower $DE_4$ at a temperature that is, for example, lower than the temperature of step (a).

It descends the length of the tower $DE_4$, heating up by internal exchange in counter-flow with a fraction of poor solvent from the tower $DE_5$ located after the tower $DE_4$ in the manner described below.

The increase in the temperature of the solvent phase rich in acid gases enables a selective vaporisation of the lightest components and, more especially, hydrocarbons and $CO_2$. The vapour phase generated in this manner by expansion and increased temperature is discharged from the head of the tower $DE_4$ via pipe 78 entraining with it the majority of the co-absorbed hydrocarbons.

The solvent phase rich in acid gases and from which at least a part of the hydrocarbons in solution have been removed, is evacuated from the base of the tower $DE_4$ via pipe 79, expanded again through the valve $V_4$ and sent to the head of the distillation tower $DE_5$ provided with the internal exchanger $Ei_5$, in which it is regenerated by distillation accompanied by simultaneous heat exchange with the solvent phase low in acid gases leaving the base of the tower $DE_5$ via pipe 80, which is recycled by the pump $P_1$ and returned to the internal exchanger $Ei_5$. Additional heat is supplied by the exchanger $Ei_6$ at the base of the tower $DE_5$.

The poor solvent phase, which has been cooled by the exchange, is discharged from the upper part of the tower $DE_5$ via pipe 81 to the tower $DE_4$ where it enters the lower part of the internal exchanger $Ei_4$. This phase continues to cool in the tower $DE_4$ by exchanging heat as it is circulated in counter-flow with the rich solvent phase which, conversely, is heated. The cooled, poor solvent phase is evacuated from the upper part of the tower $DE_4$ via pipe 82 and recycled at low temperature to the head of the contactor $C_1$.

In certain cases, in order to improve efficiency or the purity of the poor solvent phase, it is possible to place a condenser at the head of the tower $DE_5$.

The gaseous fraction obtained after the first step of regenerating the first solvent phase fraction, entraining the majority of the co-absorbed hydrocarbons, may be used as a combustion gas on site or, in order to increase production of the treated gas, recompressed and recycled upstream of step (a).

Similarly, it is possible to compress the gaseous phase from step (c), wash it with acid gases and recycle it upstream of step (a).

It is also possible to compress the gaseous phase rich in acid gases from the distillation step (b) before sending it to step (c) in order to improve efficiency of the absorption of acid gases into the second fraction of solvent phase.

The gaseous phase rich in hydrocarbons obtained from the regeneration can also be compressed to an intermediate pressure level between the pressure level of step (a) and the pressure level of step (b) so that it can be recycled upstream of step (a). This option makes it possible to increase the process output in terms of hydrocarbon production.

The present invention will be more readily understood if seen in reference to the two examples of gas treatment described below, which are in no way limitative.

Figure 8:
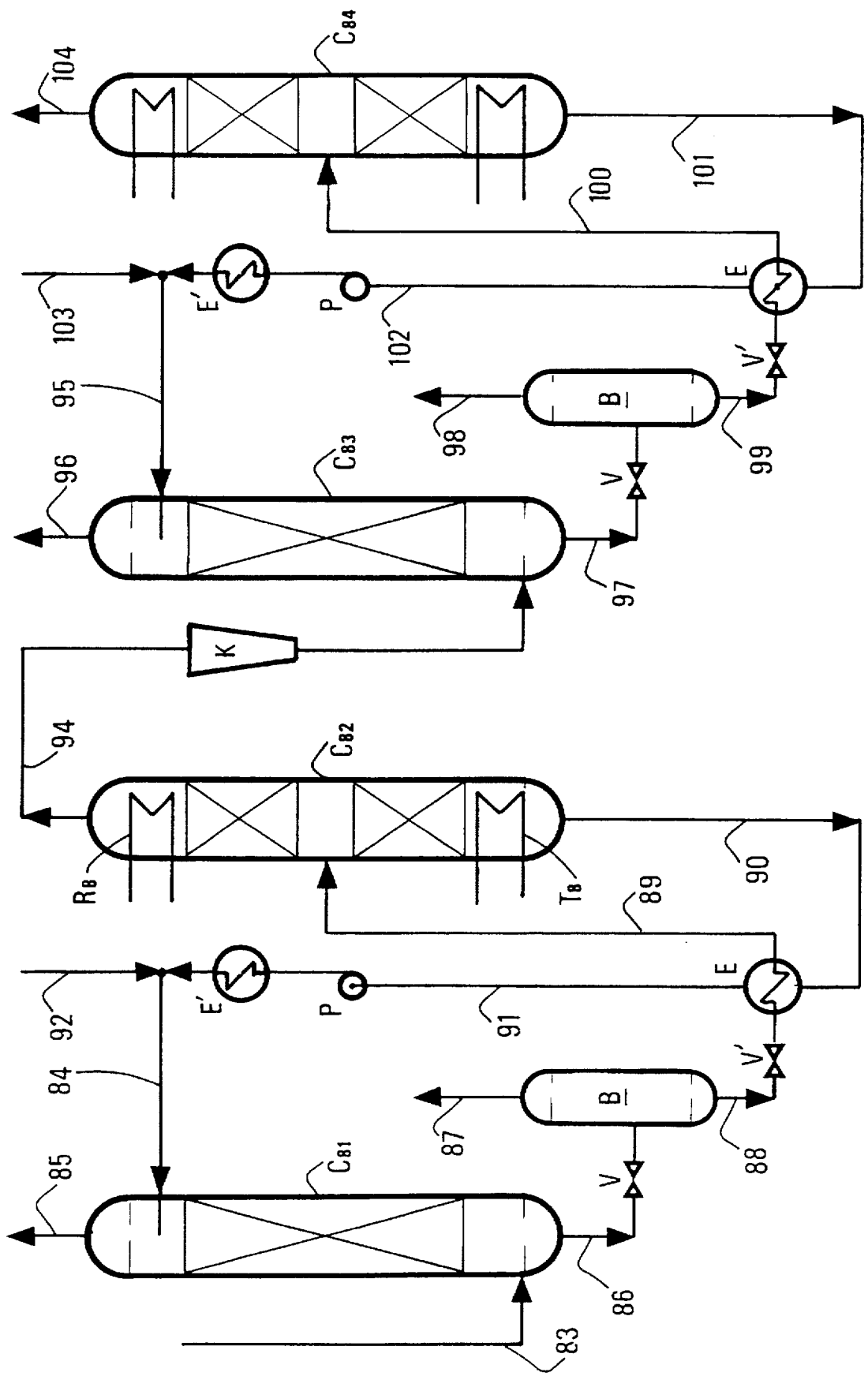
FIGS. 8 and 9 illustrate schematically two examples of implementation of the method.

Example 1 is described with reference to FIG. 8 and provides the possibility of obtaining from natural gas very concentrated acid gases that are virtually free of hydrocarbons.

The composition of the natural gas to be treated is, for example, as follows in terms of % by weight:

| WATER | 0.003 |
| METHANOL | 0.00 |
| NITROGEN | 0.763 |

| -continued | |
|---|---|
| CARBON DIOXIDE | 5.305 |
| HYDROGEN SULPHIDE | 3.196 |
| METHANE | 71.052 |
| ETHANE | 11.649 |
| PROPANE | 5.671 |
| ISOBUTANE | 0.721 |
| BUTANE | 1.105 |
| ISOPENTANE | 0.238 |
| PENTANE | 0.192 |
| HEXANE | 0.070 |
| OCTANE | 0.035 |

The gas is firstly cooled to a temperature greater than or equal to its dew-point and is of a temperature substantially close to −25° C. and a pressure level of 6.9 MPa and is injected into the processing device at a flow rate substantially equal to 17253 Kg/h.

The pre-cooled gas is fed via pipe 82 to the contactor $C_{81}$ where it is brought into counter-flow contact with a first fraction of solvent phase injected via pipe 84 into the head of the contactor. The first fraction of solvent phase is made up, for example, of a mixture of 85% by weight of methanol and 15% by weight of water, its temperature is −25° C. and its rate of injection into the contactor $C_{81}$ is 25419 Kg/h. In contact with the first solvent phase, the gas loses carbon dioxide and hydrogen sulphide and also loses at least a fraction of hydrocarbons, which are co-absorbed into the first fraction of solvent phase.

After being treated in this manner, the gas is evacuated from the head of the contactor $C_{81}$ via pipe 85 at a flow rate substantially equal to 15316 Kg/h. It is essentially made up of acid gases with close to 2.99% by mass of carbon dioxide and 0.0007% by mass (3 ppm molar) of hydrogen sulphide.

A fraction of rich solvent phase made up of 3.7% of acid gases and 3.4% of hydrocarbons is removed from the base of the contactor $C_{81}$ via pipe 86. This first fraction of rich solvent phase is passed through an expansion valve V where it is expanded to a pressure essentially equal to 0.78 MPa and conveyed to a flask B at a temperature of approximately −23° C.

At the output of the separator flask B, a vapour phase made up of about 18% $CO_2$ and 6% $H_2S$ and about 76% hydrocarbons, of which 87% is methane and ethane, is discharged from the head of the flask via pipe 87 at a flow rate of, for example, 792 Kg/h. This vapour phase may be used as combustion gas or recompressed and re-injected upstream of the contactor $C_{81}$ via an appropriate device not shown in the drawing.

The separated solvent phase rich in acid gases is remove from the base of flask B via pipe 88 at a flow rate of 26581 Kg/h, for example. It is made up of about 14% $H_2O$, 81% MEOH, 3% acid gases and 1.3% hydrocarbons. It is expanded through the valve V' to a pressure of 0.76 MPa, for example, and then reheated in the exchanger E. Its temperature at the output of this exchanger is about 108° C. and it enters via pipe 89 into the discharge zone located substantially at the centre of the distillation tower $C_{82}$.

The solvent phase rich in acid gases is regenerated inside the tower $C_{82}$ in the following manner, for example; the head of the tower is cooled to −5° C. using an internal condenser $R_8$ whilst the base is heated to 132° C., for example, using a boiler $T_8$. The regenerated solvent phase, also known as the poor solvent phase since it has had the acid gases in particular removed, is drawn off from the tower $C_{82}$ via pipe 90; it is then pre-cooled in the heat exchanger E by heat exchange with the solvent phase rich in acid gases from the separator flask B. It leaves the exchanger via pipe 91 and is picked up by a pump P and conveyed to a heat exchanger E', where it is cooled to a temperature of −25° C., for example. An external cooling fluid, for example, is used for this. After it has been mixed with a top-up delivered by pipe 92, it is recycled to the tower $C_{81}$ through pipe 84. The top-up corresponding to the losses in solvent from the treated gas is, for example, equal to some 16 kg/h.

The gaseous phase enriched with acid gas is taken from the head of the tower $C_{82}$ through pipe 94. Its temperature is about −5° C. By mass, it contains, for example, 27.6% $CO_2$, 42.7% $H_2S$ and 29.7% hydrocarbons. It is fed into the contactor $C_{83}$ at the same temperature and at a pressure level of 0.75 MPa, for example, where it is brought into counter-flow contact with a second fraction of solvent phase fed into the upper part of the contactor $C_{83}$ via pipe 95. The flow rate of this second fraction of solvent phase is 12000 Kg/h, for example, and its temperature is essentially equal to −5° C.; it may contain, for example, 50% by weight of methanol and 50% by weight of water.

At the head of the tower $C_{83}$, the vapour phase enriched with hydrocarbons leaves via pipe 96 at a flow rate of, for example, 580 Kg/h, its composition by mass being 56.3% hydrocarbons, 42% $CO_2$ and 1.7% $H_2S$. It may be recompressed and recycled upstream of the process of the invention.

The second fraction of solvent phase rich in acid gases leaves the bottom of the contactor $C_{83}$ via pipe 97. It is expanded through the valve V to a pressure of 0.16 MPa, for example, and is fed into the separator flask B at a temperature of −3.2° C.

At the output of the separator flask B, the vapour phase rich in acid gases obtained from the separation process leaves the head of the flask via pipe 98. This phase has a hydrocarbon content of less than 5%, for example.

From the base of the flask, a solvent phase or liquid phase is drawn off via pipe 99. In order to produce an acid gas with a particularly high concentration of $H_2S$, the solvent phase is expanded through the valve V' and then reheated in the exchanger E before being fed via pipe 100 to the distillation tower $C_{84}$. It enters the discharge zone of the tower at a temperature of 73° C. and a pressure of 0.15 MPa, for example. The head of the tower $C_{84}$ is cooled to −10° C. whilst the base is heated to 90.4° C.

The poor solvent phase that has the acid gases removed from it, for example, leaves the tower $C_{84}$ via pipe 101 located at the base of the tower and is pre-cooled in the heat exchanger E by heat exchange with the rich solvent from the separator flask B. The cooled poor solvent phase is picked up by the pump P and conveyed via pipe 111 to the exchanger E' where it is cooled to a temperature of −5° C., for example, and then recycled back to the contactor $C_{83}$ after being mixed with additional solvent at 4.1 Kg/h from pipe 103. The cooling process is operated using, for example, an external cooling fluid not shown in the drawing. The solvent used as a top-up may be made up of 100% methanol corresponding to the losses from the two vapour phases rich in acid gases.

The gaseous phase with a particularly high concentration of $H_2S$ is extracted from the head of the tower $C_{84}$ via pipe 104, its flow rate being 195 Kg/h and its composition by mass being 94% $H_2S$, 5% $CO_2$ and 1% hydrocarbons.

With a treated gas containing hydrogen sulphide $H_2S$ and carbon dioxide $CO_2$, it is possible to produce a gaseous phase from the second absorption step (c), from which at least a part of the $H_2S$ has been removed and which is sufficiently rich in $CO_2$ to enable a gaseous phase with a particularly high concentration of $H_2S$ to be produced at the end of step (d).

To do this, it is necessary to fix the flow rate of the second fraction of solvent phase at a sufficiently high level to absorb at least the major part of the hydrogen sulphide, whilst keeping the level low enough to limit absorption of the carbon dioxide.

In the method of the invention, the solvents used are preferably polar and fully or at least partially miscible water.

The water content of the first fraction of solvent phase is preferably at least 10% of the fraction by mass.

In order to reduce the co-absorption of hydrocarbons during step (c), the water content of the fraction by mass of the second fraction of solvent phase should preferably be greater than the water content of the fraction by mass of the first fraction of solvent phase, and preferably at least 30%.

An identical or different solvent may used for absorption steps (a) and (c); it may include methanol.

A polar solvent containing an alcohol other than methanol, such as, for example, ethanol, 2-methoxyethanol, propanol, butanol, propargylic alcohol or also an ether, which may be a polyethylene glycol ether, for example, may also be used for the two absorption steps (a) and (c).

It is also possible to use ketones, for example acetone or methylethyl ketone or possibly solvents from the etherocyclic family, such as for example, sulpholane, pyridine, N-methylpyrolidone, tetrahydrofurane, furfural ... etc.

Generally speaking, other polar solvents such as, for example, dimethylformamide or morpholine, may be used. In the case of a gas containing carbon dioxide, it may be beneficial to use a polar solvent containing carbonate of propylene for the two absorption steps (a) and/or (c).

In order to improve the absorption of the acid gases whilst reducing the co-absorption of light hydrocarbons, a solvent containing a mixture of at least two polar solvents may be used.

The solvent used for steps (a) and/or (c) of the method may also contain both a physical solvent, such as a polar solvent, and a chemical solvent which might be an amine, for example.

The principle of the method of the invention is based on separation techniques using cooled in a polar solvent under cooling. As a result, it is therefore necessary to cool the gas to be treated before it is introduced into the process and in particular before it is brought into contact with the cooled solvent.

If the gas to be treated is a water saturated gas, hydrates may form during cooling. In order to prevent the formation of hydrates, the natural gas to be treated is cooled in the presence of, for example, a polar solvent before being fed to the de-acidification or absorption step (a), which, in the case of a rich gas, gives rise to the production of a liquid phase rich in hydrocarbons and an aqueous liquid phase rich in solvent. This aqueous phase rich in solvent is recycled, brought into counter-flow contact with the gas or a fraction of the gas to be treated in order to separate the water from the solvent and to saturate the gas partially with the solvent in order to prevent the formation of hydrate during the cooling phase.

Patent FR-2.605.241 describes the advantages of carrying out the following steps in particular in a single operation: dehydration, separation of the liquid phase rich in hydrocarbons including in particular a LPG fraction and regeneration of the solvent phase.

Figure 9:
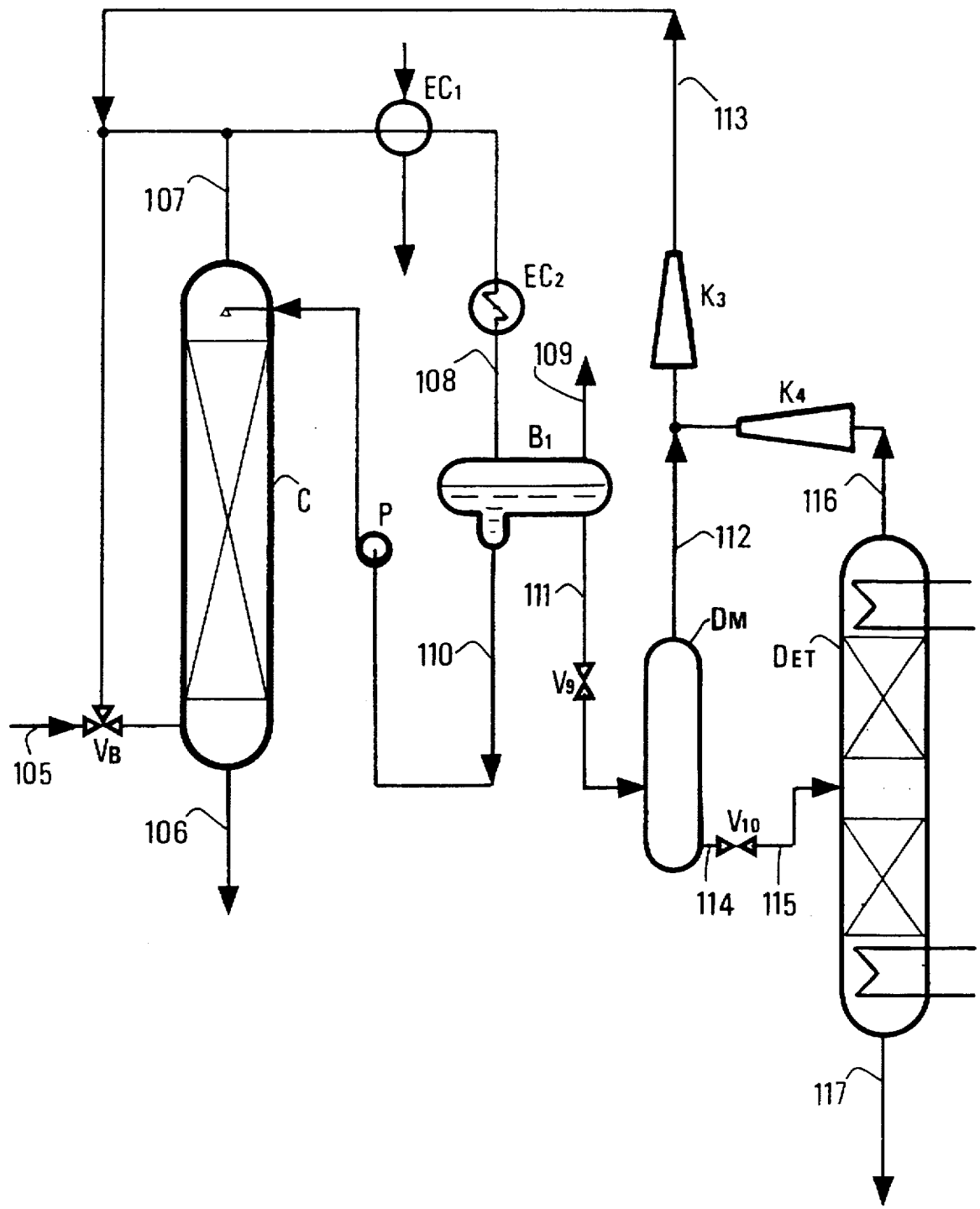

A second example of implementing the method of the invention described with reference to FIG. 9 provides the possibility of removing, at least to a certain extent, the methane, ethane and acid gases dissolved in the natural gas to be treated so as to meet the requisite specifications for transport or storage of the liquid fraction of the natural gas or LPG.

To this end, and this is another objective of the present invention, the liquid fraction or LPG may be fed to a first de-methanisation step carried out, for example, by reducing the pressure and/or raising the temperature, leading to the formation of a gaseous phase rich in methane, which is removed from the LPG fraction and then sent to a second stage of de-ethanisation during which, it has been discovered, at least a large part of the residual methane, the ethane as well as the acid gases are separated from the hydrocarbons other than the methane and ethane.

The example described below relates to the treatment of natural gas containing associated higher hydrocarbons as well as acid gases made up mainly of hydrogen sulphide $H_2S$ and carbon dioxide $CO_2$, its composition expressed in % by mass being, for example, as follows:

| WATER | 0.14 |
|---|---|
| NITROGEN | 0.663 |
| CARBON DIOXIDE | 3.934 |
| HYDROGEN SULPHIDE | 3.425 |
| METHANE | 64.881 |
| ETHANE | 12.032 |
| PROPANE | 7.182 |
| ISOBUTANE | 1.489 |
| BUTANE | 2.528 |
| ISOPENTANE | 0.837 |
| PENTANE | 0.802 |
| HEXANE | 0.708 |
| OCTANE | 1.360 |

The gas to be treated is introduced at a temperature of 43° C., for example, a pressure level of 6.9 MPa and a flow rate of 20,240 T/h.

The gas, which is saturated in water, is delivered through pipe 105 and passes through a valve or by-pass $V_B$ so that about 50% of the flow is fed into the contactor C whilst the remaining 50% is by-passes it. The 50% of the flow introduced into the contactor C are brought into counter-flow contact with a liquid phase comprising, for example, a mixture of 65% by weight of solvent, such as methanol, and 35% by weight of water. This liquid phase is introduced at a flow rate of 72.7 Kg/h, a pressure substantially equal to 6.97 MPa and a temperature of about 43° C. Since the flow of the natural gas to be treated is substantially greater than the flow of the liquid phase, the methanol is vaporised and entrained with the gaseous phase (of natural gas), whereas the water removed from the methanol in this way is collected at the base of the contactor C and is discharged via pipe 106 at a flow rate of, for example, 28.1 Kg/h; it now contains only 100 ppm by mass of methanol.

After this contact process, the gaseous phase is evacuated from the head of the contactor C via pipe 107, mixed with the part of the by-passed gas on the one hand and at least a part of the recycled gas from the various steps of the process described below on the other. These parts are pre-cooled in the exchanger $EC_1$, then cooled to a temperature of $-25°$ C. in the heat exchanger $EC_2$, sing a cooling fluid, for example, before being fed into the separator flask $B_1$ via pipe 108.

Organised in this manner, the cooling process makes it possible to separate in the flask a fraction of LPG rich in hydrocarbons containing more than 3 carbon atoms and also to separate the major part of the water and the methane contained in all the gas arriving at the exchanger $EC_1$, and a gaseous phase from which some of the hydrocarbons greater than 2 carbon atoms have been removed.

This gaseous phase with a low water content is discharged via pipe 109 and sent to the different steps (a), (b), (c), (d) described above.

The liquid phase consisting of 65% by weight of methanol and 35% by weight of water, with a flow rate of 72.7 Kg/h is removed from the flask $B_1$ via pipe 110, pumped by the pump P and recycled back to the contactor C. The quantity of water corresponds, for example, to the quantity of water contained in the gas before the dehydration phase.

The LPG fraction obtained in the flask $B_1$ is evacuated via pipe 111 at a flow rate of 3681 Kg/h, a temperature of $-25°$ C. and a pressure level of 6.9 MPa. By mass, its composition, for example:

| WATER | 0.0042 |
|---|---|
| METHANOL | 0.2787 |
| NITROGEN | 0.1132 |
| CARBON DIOXIDE | 3.211 |
| HYDROGEN SULPHIDE | 5.70 |
| METHANE | 26.97 |
| ETHANE | 16.835 |
| PROPANE | 16.494 |
| ISOBUTANE | 5.029 |
| BUTANE | 8.076 |
| ISOPENTANE | 3.481 |
| PENTANE | 3.487 |
| HEXANE | 2.898 |
| OCTANE | 7.417 |

This LPG fraction containing acid gases, methane and ethane is expanded through the valve $V_9$ to a pressure of 3.25 MPa and fed into the de-methaniser flask $D_{M1}$. At the output of the de-methaniser flask, the enriched gaseous phase, which contains more than 75% by weight of methane, is discharged through pipe 112, recompressed by the compressor $D_3$ and recycled via pipe 113 upstream of the exchanger $EC_1$. Its flow is 744.5 Kg/h for example.

The liquid phase produced in the de-methaniser flask is removed from the flask at a flow of 2936.7 Kg/h via pipe 114, expanded through the valve $V_1$ at a pressure of 1.25 MPa, for example, and enters the head of the tower $D_{ET}$ via pipe 115 at a temperature of $-62.5°$ C., for example.

The boiler B of this tower is heated, for example, to a temperature of 69° C. and for certain applications the tower may have a condenser at its head. It has been discovered that the de-ethanisation operation carried out in this way makes it possible to separate to a large extent the hydrocarbons with less than 3 carbon atoms and enrich the higher hydrocarbons with acid gases.

The vapour phase enriched with acid gases leaves the head of the tower via pipe 116 at a temperature of $-9°$ C. and a flow rate of 1335 Kg/h and it contains in % by weight more than 20% acid gases, 32% methane, 40% ethane and only 7.5% hydrocarbons greater than 2 carbon atoms. This vapour phase is recompressed by the compressors $K_3$ and $K_4$ and recycled via pipe 113 upstream of the exchanger $EC_1$.

The liquid phase produced during the de-ethanisation phase is evacuated from the base of the tower $E_{ET}$ via pipe 117 at a flow rate of, for example, 1601.6 Kg/h and with a % composition by weight of:

| CARBON DIOXIDE | 0.000 |
|---|---|
| HYDROGEN SULPHIDE | 0.002 |
| ETHANE | 0.0006 |
| PROPANE | 31.00 |
| ISOBUTANE | 11.00 |
| BUTANE | 17.85 |
| ISOPENTANE | 7.90 |
| PENTANE | 7.95 |
| HEXANE | 6.65 |
| OCTANE | 17.04 |

This example illustrates perfectly how the possibility of producing de-acidified and perfectly stabilised LPGs was discovered.

The treatment of a natural gas is generally operated at a pressure level imposed by production constraints, which in particular can mean a level equal to the production pressure of the natural gas deposit or the pressure at which it is transported by gas pipe, for example. Generally speaking, the absorption step (a) of the method is preferably carried out at a pressure level in the range between 1 and 20 MPa.

The temperature at which step (a) is carried out is preferably between 5° and $-50°$ C.

The pressure level during the second absorption step or step of washing with acid gases (c) is generally set at a level lower than the pressure of step (a) at a level which is sufficient for the gaseous phase rich in hydrocarbons obtained from step (c) to be compressed easily so that it can be recycled upstream in the process. This pressure level is preferably in the range between 0.4 and 2 MPa.

In order to make a substantial saving on the energy used to regenerate the gaseous phase from step (a) or/and that resulting from step (c), it may be of advantage to operate the distillation step using a vertical plate exchanger forming a network of alternating channels in which a heat exchange and transfer of substances are organised simultaneously.

The exchange of heat between the poor solvent phase circulating from the bottom to the top of a tower whilst it cools and the rich solvent phase which flows from the top to the bottom whilst it is brought into counter-flow contact with the vapour phase generated produces simultaneously a transfer of substance between the two phases and a transfer of heat with the regenerated solvent phase flowing in these adjacent channels.

The method makes it possible to remove the acid gases contained in a natural gas but also those incorporated in a refinery gas or any gaseous effluent that contains both hydrocarbons and acid gases. It makes it possible to remove acid gases such as $H_2S$ and $CO_2$ as well as mercaptans of chemical formula R—SH, COS and $CS_2$.

The various steps of the method of the invention may be carried out in towers provided with contact zones that enable a transfer of substance to be made between the gaseous phases and the liquid phases. To this end, the contact zones may be provided with perforated plates, cloches, fins or arranged as continuous contact zones containing a matrix. This matrix may be made up of bulk elements such as Raschig rings, Pall rings or Berl saddles, all known to the person skilled in the art. It may also be made up of a structured matrix formed by cloth, knitted fabrics or sheets that may be perforated or corrugated and/or which form channels so as to increase efficiency.

These plates or matrices may be made from different materials, such as ceramics, aluminum, stainless steel or plastics materials.

17

Static mixers, known to the person skilled in the art, may also be used. These mixers are generally formed by a network of cross blades that make it possible to create an inner conduit between the gaseous phase and the liquid phase circulating in parallel-flow, the two being separated at the output in a separator.

We claim:

1. A method of treating a gas containing at least one hydrocarbon and at least one acid gas to at least partially remove the acid gas from the gas and to produce at least one concentrated acid gas, which comprises the following steps:
   (a) the gas is cooled to a temperature lower than or equal to ambient temperature and the cooled gas is brought into contact with a first mixture of a solvent phase containing at least one physical polar solvent and water in a first contact zone to provide a first fraction of a solvent phase which is rich in acid gas and which contains the hydrocarbon in solution and a fraction of gas which is low in acid gas,
   (b) the first fraction of solvent phase rich in acid gas obtained in step (a) is regenerated by expansion in a first regeneration zone to produce a gaseous fraction that is rich in acid gas and that contains the hydrocarbon and a solvent phase that is low in acid gas and said solvent phase is recycled back to the first contact zone of step (a),
   (c) the gaseous fraction rich in acid gas containing the hydrocarbon obtained in step (b) is brought into contact with a second mixture of solvent phase containing at least one physical polar solvent and water in a second contact zone to produce a gaseous fraction that is enriched with hydrocarbon and a second fraction of a solvent phase that is enriched with acid gas,
   (d) the second fraction of solvent phase enriched with acid gas from step (c) is regenerated by expansion in a second regeneration zone separated from the first regeneration zone to produce a gaseous fraction with a higher concentration of acid gas than the gaseous fraction separated during step (b) and a fraction of solvent phase which is recycled back to the second contact zone of step (c), said second contact zone being separated from the first contact zone.

2. A method according to claim 1, wherein the second mixture of solvent phase contains the same polar solvent as that contained in the first mixture of solvent phase used during step (a).

3. A method according to claim 1, wherein water content in the second fraction of solvent phase is at least equal to the water content of the first fraction of solvent phase.

4. A method according to claim 1, wherein step (b) is carried out at an intermediate pressure level between a pressure at which step (a) is carried out and a pressure at which step (d) is carried out.

5. A method according to claim 4, wherein the second fraction of solvent phase is regenerated during step (d) by a simple expansion at a pressure lower than a pressure at which step (c) is carried out.

6. A method according to claim 1, wherein the first fraction of solvent phase is regenerated in a distillation zone at a pressure lower than a pressure at which step (c) is carried out.

7. A method according to claim 6, wherein the regeneration of one of the first or second fraction of solvent phase is carried out by distillation accompanied by simultaneous heat exchange between this solvent phase, which is heated gradually, and the solvent phase obtained from the regeneration which is cooled by being circulated in counter-flow with the solvent phase that is to be regenerated.

8. A method according to claim 1, wherein the second fraction of solvent phase from step (c) is subjected to intermediate regeneration by expansion to produce a gaseous phase rich in hydrocarbons during step (c) before being fed to step (d).

9. A method according to claim 1, wherein the first fraction of solvent phase from step (a) is put through a process of regeneration at an intermediate pressure level between a pressure at which step (a) is carried out and a pressure at which step (b) is carried out to produce a gaseous fraction rich in hydrocarbons.

10. A method according to claim 1, wherein the first and second gaseous fractions obtained, respectively, from step (c) and step (b) are compressed and recycled back to the first contact zone of step (a).

11. A method according to claim 1, wherein the gaseous fraction from step (b) is compressed before being moved to the second contact zone of step (c).

12. A method according to claim 1, wherein the gas to be treated comprises a natural gas that contains at least one acid gas selected from the group consisting of carbon dioxide and hydrogen sulfide.

13. A method according to claim 1, wherein the gas to be treated comprises natural gas that contains at least carbon dioxide and hydrogen sulfide and the flow rate of the second fraction of solvent phase is maintained at a sufficiently high value to obtain at the end of step (c) a gaseous fraction from which hydrogen sulfide has been essentially removed and a flow rate low enough to maintain in this gaseous fraction a relatively high concentration of carbon dioxide, the gaseous fraction from step (d) having a high concentration of hydrogen sulfide.

14. A method according to claim 1, wherein the polar solvent used during steps (a) and (c) is selected from the group consisting of methanol, ethanol, 2-methoxyethanol, propanol, butanol, propargylic alcohol, a polyethylene glycol ether and carbonate of propylene.

15. A method according to claim 1, wherein the polar solvent used during steps (a) and (c) contains at least two polar solvents.

16. A method according to claim 1, wherein the solvent phase used during steps (a) and (c) contains a polar solvent and an amine.

17. A method according to claim 1, wherein the water content of the first fraction of solvent phase is at least 10% by wt. of the fraction.

18. A method according to claim 1, wherein the gas to be treated is cooled in the presence of a polar solvent before being treated in step (a) to produce a gaseous phase which is fed to step (a), a liquid phase rich in hydrocarbons and an aqueous liquid phase rich in solvent.

19. A method according to claim 1, wherein water is separated from the polar solvent by contact in counter-flow with at least one fraction of treated gas.

20. A method according to claim 1, wherein step (a) is carried out at a pressure in the range between 1 and 20 MPa.

21. A method according to claim 1, wherein step (a) is carried out at a temperature in the range between +5° and −50° C.

22. A method according to claim 1, wherein step (c) is carried out at a pressure ranging between 0.4 and 2 MPa.

23. A method according to claim 1, wherein at least one of the fractions of solvent phase mixture used during steps (a) and (c) is regenerated by distillation accompanied by heat exchange in a vertical plate exchanger comprising alternating passages in which counter-flow contact is made between a liquid phase and a vapor phase generated during the distillation and in which a solvent phase obtained during said regeneration flows, said solvent phase being cooled during the regeneration as it is circulated in counter-flow.

24. A method according to claim 1, wherein the expansion energy from the one or the two fractions of solvent phase mixture is converted into mechanical energy by a turbine.

25. A method according to claim 1, wherein the second mixture of solvent phase contains the same polar solvent as that contained in the first mixture of solvent phase used during step (a), but the water content of the first and second mixtures is different.

26. A method according to claim 6, wherein the regeneration of the first fraction of solvent phase is carried out by distillation accompanied by simultaneous heat exchange between said first fraction of solvent phase, which is heated gradually, and the solvent phase obtained from the regeneration of step (b) which is cooled by being recirculated in counter-flow with the first fraction of solvent phase that is to be regenerated.

27. A method according to claim 6, wherein the regeneration of the second fraction of solvent phase is carried out by distillation accompanied by simultaneous heat exchange between said second fraction of solvent phase, which is heated gradually, and the solvent phase obtained from the regeneration which is cooled by being circulated in counter-flow with the second fraction of solvent phase that is to be regenerated.

28. A method of treating a gas containing at least one hydrocarbon and at least one acid gas to at least partially remove the acid gas from the gas and to produce at least one concentrated acid gas, which comprises the following steps:

(a) the gas is cooled to a temperature lower than or equal to ambient temperature and the cooled gas is brought into contact with a first mixture of a solvent phase containing at least one polar solvent and water in a first contact zone to provide a first fraction of a solvent phase which is rich in acid gas and which contains the hydrocarbon in solution and a fraction of gas which is low in acid gas, (b) the first fraction of solvent phase rich in acid gas obtained in step (a) is regenerated by expansion in a first regeneration zone to produce a gaseous fraction that is rich in acid gas and that contains the hydrocarbon and a solvent phase that is low in acid gas and said solvent phase is recycled back to the first contact zone of step (a), (c) the gaseous fraction rich in acid gas obtained in step (b) is brought into contact with a second mixture of solvent phase containing at least one polar solvent and water in a second contact zone to produce a gaseous fraction that is enriched with hydrocarbon and a second fraction of a solvent phase that is enriched with acid gas, (d) the second fraction of solvent phase enriched with acid gas from step (c) is regenerated by expansion in a second regeneration zone to produce a gaseous fraction with a higher concentration of acid gas than the gaseous fraction separated during step (b) and a fraction of solvent phase which is recycled back to the second contact zone of step (c), wherein the water content of the second fraction of solvent phase is greater than the water content of the first fraction of solvent phase and is at least 30% by wt.

29. A method of treating a gas containing at least one hydrocarbon and at least one acid gas to at least partially remove the acid gas from the gas and to produce at least one concentrated acid gas, which comprises the following steps:

(a) the gas is cooled to a temperature lower than or equal to ambient temperature and the cooled gas is brought into contact with a first mixture of a solvent phase containing at least one polar solvent and water in a first contact zone to provide a first fraction of a solvent phase which is rich in acid gas and which contains the hydrocarbon in solution and a fraction of gas which is low in acid gas, (b) the first fraction of solvent phase rich in acid gas obtained in step (a) is regenerated by expansion in a first regeneration zone to produce a gaseous fraction that is rich in acid gas and that contains the hydrocarbon and a solvent phase that is low in acid gas and said solvent phase is recycled back to the first contact zone of step (a), (c) the gaseous fraction rich in acid gas obtained in step (b) is brought into contact with a second mixture of solvent phase containing at least one polar solvent and water in a second contact zone to produce a gaseous fraction that is enriched with hydrocarbon and a second fraction of a solvent phase that is enriched with acid gas, (d) the second fraction of solvent phase enriched with acid gas from step (c) is regenerated by expansion in a second regeneration zone to produce a gaseous fraction with a higher concentration of acid gas than the gaseous fraction separated during step (b) and a fraction of solvent phase which is recycled back to the second contact zone of step (c), wherein the gas to be treated contains at least one fraction of liquid hydrocarbon (LPG), said fraction being fed to a stage of de-methanisation in which the pressure is reduced and the temperature is raised and then to a stage of de-ethanisation during which the residual methane, the ethane as well as the acid gas present in the liquid hydrocarbon fraction are at least partially separated off.

* * * * *